United States Patent [19]

Mowry et al.

[11] Patent Number: 4,535,375
[45] Date of Patent: Aug. 13, 1985

[54] MAGNETORESISTIVE HEAD

[75] Inventors: Gregory S Mowry, Burnsville; Peter K. George, Bloomington, both of Minn.

[73] Assignee: Magnetic Peripherals, Inc., Minneapolis, Minn.

[21] Appl. No.: 457,830

[22] Filed: Jan. 14, 1983

[51] Int. Cl.³ .............................................. G11B 5/30
[52] U.S. Cl. .................................. 360/113; 324/252; 338/32 R
[58] Field of Search ................ 360/110, 113; 324/252; 338/32 R

[56] References Cited

U.S. PATENT DOCUMENTS

| | | | |
|---|---|---|---|
| 3,405,355 | 10/1968 | Hebbert | 324/46 |
| 3,493,694 | 2/1970 | Hunt | 179/100.2 |
| 3,848,217 | 11/1974 | Lazzari | 338/32 R |
| 3,860,965 | 1/1975 | Voegeli | 360/113 |
| 3,979,775 | 9/1976 | Schwartz | 360/113 |
| 4,040,113 | 8/1977 | Gorter | 360/113 |
| 4,048,557 | 9/1977 | Chen | 324/46 |
| 4,052,748 | 10/1977 | Kuijk | 360/113 |
| 4,103,315 | 7/1978 | Hempstead et al. | 360/110 |
| 4,141,051 | 2/1979 | Kuijk et al. | 360/113 |
| 4,142,218 | 2/1979 | Gorter | 360/113 |
| 4,315,291 | 2/1982 | Lazzari | 360/113 |
| 4,321,640 | 3/1982 | van Gestel | 360/113 |

Primary Examiner—Stuart N. Hecker
Assistant Examiner—David J. Severin
Attorney, Agent, or Firm—William J. McGinnis; Joseph A. Genovese

[57] ABSTRACT

A magnetic read head has a first embodiment comprising an elongated magnetoresistive element having a central region and distant ends. The central region has equipotential strips disposed intermediate to its ends, and detection circuitry is electrically connected to these intermediate equipotential strips to sense the changing resistance of the central region in the presence of data magnetically recorded on a medium. In a second embodiment, the magnetoresistive element is folded into a picture frame shape and has its ends joined. The element is vertically arranged so that one of the legs of the element is positioned in proximity to a selected track of a recording medium. A pair of equipotential strips are disposed at opposite ends of the leg to define a sensing region therebetween. Detection circuitry is connected to these equipotential strips to detect the changing resistance of the sensing region in the presence of the magnetic fields of the medium.

4 Claims, 5 Drawing Figures

MAGNETORESISTIVE HEAD

BACKGROUND

The present invention relates to magnetoresistive heads, examples of which are shown in U.S. Pat. Nos. 4,040,113; 4,141,051; 4,052,748; 3,848,217; 4,142,218; 3,979,775; 4,103,315; 4,315,291; 3,493,694; 3,405,355; 4,321,640; and 3,860,965.

Magnetoresistive heads include a strip-shaped element of a ferromagnetic, metallic, magnetically anisotropic material, for example NiFe, commercially known as Permalloy, which is deposited in a thin film on a substrate and positioned either with one of its edges in the immediate proximity of a magnetic recording medium, or alternatively, the element is positioned remotely from the medium with a flux guide arranged to bring the magnetic fields of the medium to the element. The fields of the recording medium produce variations in the magnetization of the element and thereby modulate the resistance of the element via the magnetoresistive effect. In order to measure the changing resistance of the magnetoresistive element, the element is electrically biased. This is typically done by directing an electric current through the element. Detection circuitry is then connected to the element so that the changing resistance of the element can be monitored to produce an output which is representative of the information stored on the medium.

A problem associated with prior art magnetoresistive heads has been the presence of Barkhausen noise in the output of the heads caused by the erratic movement of magnetic domain walls in the magnetoresistive element in response to the magnetic fields of the medium.

Another problem has been to ensure that the magnetic field generated by the bias current in the magnetoresistive element does not become so great as to alter the magnetically recorded data on the medium.

SUMMARY

The magnetoresistive head of the present invention is, therefore, designed to eliminate Barkhausen noise by producing single domain magnetization in the read portion, or active region, of the magnetoresistive element. In addition, the element is designed to require only a minimal bias current to produce single domain magnetization in the active region of the element.

The invention achieves this object by employing an elongated magnetoresistive element wherein only the central region of the element is utilized for reading the data. By moving the ends of the magnetoresistive element far away from the central "active region" of the element, the demagnetizing effects of the magnetic fields at the ends of the element on the central region of the element are minimized, and a minimal amount of current is, therefore, required to achieve a single domain magnetic orientation in the central active region. By producing a single domain active region, Barkhausen noise caused by the movement of domain walls is eliminated since the domain walls are themselves eliminated in the active region. In this "hammer head" embodiment, the changing resistance of the element is sensed only across the active region rather than across the entire element. Equipotential strips are disposed on opposite ends of the active region and directly connected to the detection circuitry to facilitate this selective reading of the element.

In a second embodiment, the ends of the elongated magnetoresistive element are, in effect, joined in that the magnetoresistive element is folded into an endless vertically oriented frame. In this "picture frame" embodiment, the magnetoresistive frame element has two horizontal legs and two vertical legs, with only one of the horizontal legs of the frame being used to read data. The demagnetizing forces produced by the ends of the element are eliminated since the ends themselves have been eliminated, and only a minimal amount of bias current is, therefore, required to achieve single domain magnetization in the four magnetoresistive elements of the frame.

It is, therefore, an object of the present invention to provide an improved magnetoresistive read head.

It is another object to provide a magnetoresistive read head wherein the magnetic flux path of the element is substantially longer than the central active region of the element employed for reading data from the medium.

Another object is to provide an elongated magnetoresistive read head wherein a minimal current is required to achieve a single domain orientation in the central active region of the element used for reading data.

Still another object is to provide a magnetoresistive read element wherein the changing resistance of the central active region of the element is measured between equipotential strips disposed on opposite ends of the active region.

Yet another object is to effectively provide a very long magnetoresistive read element in order to minimize the effect of the demagnetization forces produced by the ends of the element.

Still another object is to effectively provide a very long magnetoresistive read element by folding the element and joining its ends.

These and other objects, advantages and novel features of the invention will become apparent from the following detail description of the invention taken in conjunction with the accompanying drawings.

DESCRIPTION OF THE PREFERRED EMBODIMENT

The basic principal of the present invention is most easily described with reference to FIGS. 1A through 1D.

Figure 1A:
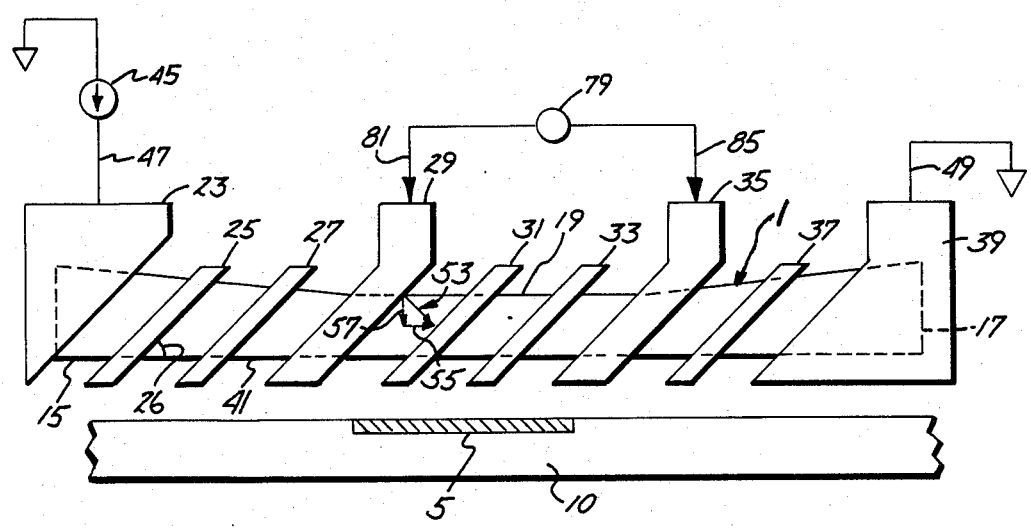
FIG. 1A shows the hammerhead embodiment of the present invention.
Figure 1B:
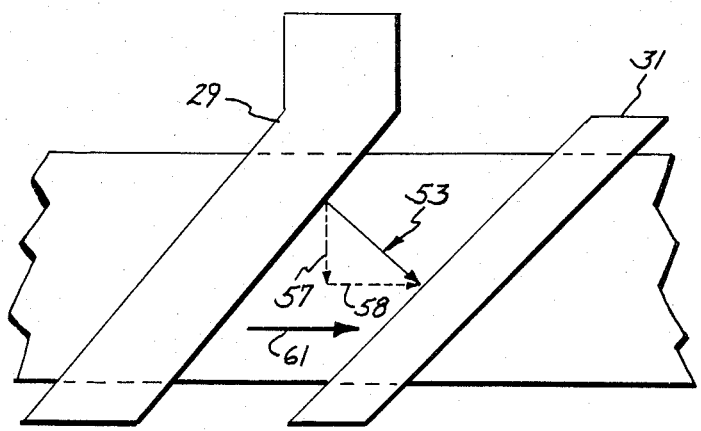
FIG. 1B shows a portion of the FIG. 1A embodiment.
Figure 1C:
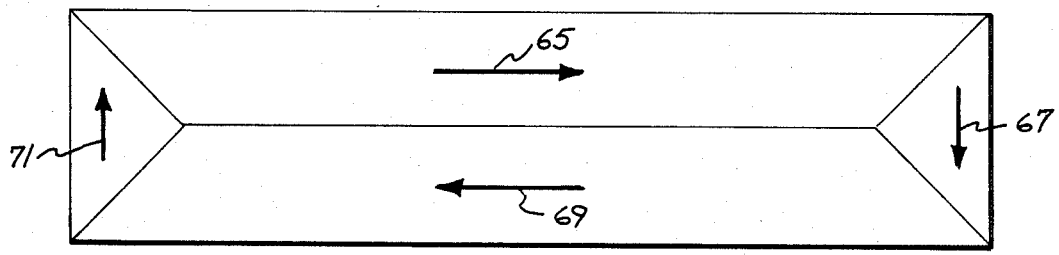
FIG. 1C shows an unmagnetized magnetoresistive strip.
Figure 1D:
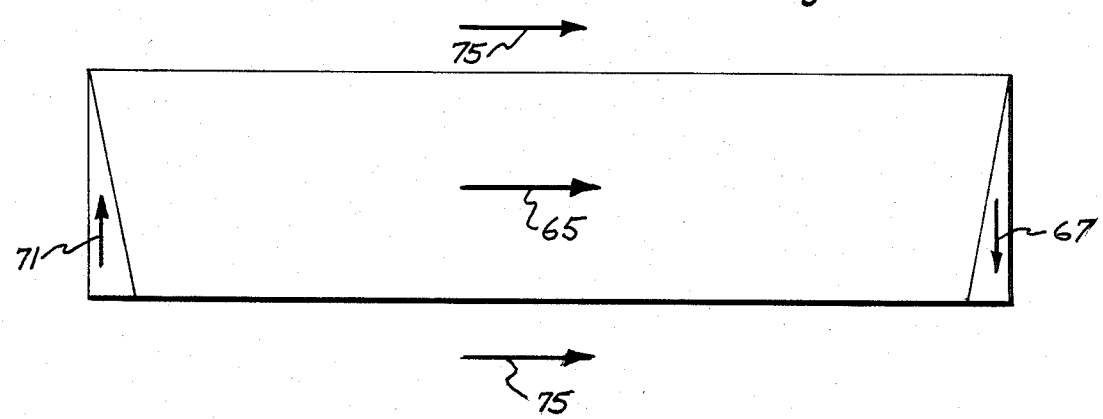
FIG. 1D shows a magnetoresistive strip under the influence of an external magnetic bias.

FIG. 1A shows an elongated magnetoresistive element 1 such as would be deposited on a substrate (not shown) and incorporated into a magnetic head (not shown) to read a selected track 5 of the magnetic recording medium 10. Element 1 has a distant first end 15, and a distant second end 17, and a central region 19 intermediate the distant ends 15, 17. Equipotential strips 23, 25, 27, 29, 31, 33, 35, 37 and 39 are disposed at acute angles with respect to the lower edge 41 of the element 1. For example, strip 25 is disposed at acute angle 26 with respect to lower edge 41 of the element 1 as shown. Typically, the strips 23, 25, 27, 29, 31, 33, 35, 37 and 39 would be disposed at 45 degree angles across the element 1, but other acute angles could also be employed. A current source 45 drives current through the element 1 from its input 47 to its output 49. With the current flowing from left to right in FIG. 1A, it is well known that the current will leave and enter each equipotential strip 23, 25, 27, 29, 31, 33, 35, 37 and 39 in a direction normal to the edge of the strip. Thus, for example, the current will leave strip 29 and enter strip 31 along vector 53 in FIG. 1A. Vector 53 has a vector component 55 which is parallel to the longitudinal axis of element 1 and a vector component 57 which is transverse to the longitudinal axis of element 1. These vectors are better shown in FIG. 1B. It is known that the easy direction of magnetism in a narrow elongated magnetoresistive element is along the longitudinal axis. It is also known that by applying the right hand rule to transverse vector 57 we can determine that the magnetic flux generated by the vector 53 will be in the direction of vector 61. To understand the effect of this magnetic bias, reference is first made to FIGS. 1C and 1D. FIG. 1C shows an unmagnetized elongated strip of magnetoresistive material. In the unmagnetized state, the strp is multidomain, and in this example the strip would be divided into four magnetic domains directed along the vectors 65, 67, 69, and 71, respectively. If we apply an external magnetic field along the direction of vector 75 in FIG. 1D, however, we see that the magnetic domain parallel to the direction of the external field 75 grows, and that at a certain level of external magnetic field bias, the central region of the strip becomes single domain magnetized in the direction of vector 65. The end regions remain multidomain. The amount of magnetic bias necessary to produce single domain magnetization in the central region is a function of the demagnetizing forces exerted on the central region by the ends of the element. Therefore, the longer we make the element, the less bias current is required to produce single domain magnetization in the central region. When the central region becomes single domain, domain walls in the region are eliminated, and therefore, Barkhausen noise is eliminated.

Hence, returning to FIGS. 1A and 1B, if we consider all of the transverse components of the current vectors for the element 1, we can appreciate that, at a certain level of external bias current, the cenral region 19 of the element 1 will become single domain magnetized in the direction of vector 61. Since the ends 15 and 17 are distant from region 19, only a relatively small biasing current is required to overcome the demagnetizing effect produced by the ends 15,17 on the central region 19 in order to make region 19 single domain. Region 19 is bounded by equipotential strips 29 and 35. As shown in FIG. 1A, voltage drop sensing circuitry 79 is connected by electrical contact 81 to equipotential strip 29 and by electrical contact 85 to equipotential strip 35. The resistance of central region 19 fluctuates in response to the magnetic fields recorded on track 5 of the medium 10. The response of the single domain magnetoresistive region 19 to the fluctuating fields of track 5 is superior to that of a multidomain region since Barkhausen noise is eliminated as noted. The changing resistance of central region 19 in response to the recorded data is sensed by circuity 79 to generate an output voltage representative of the data.

Figure 2:
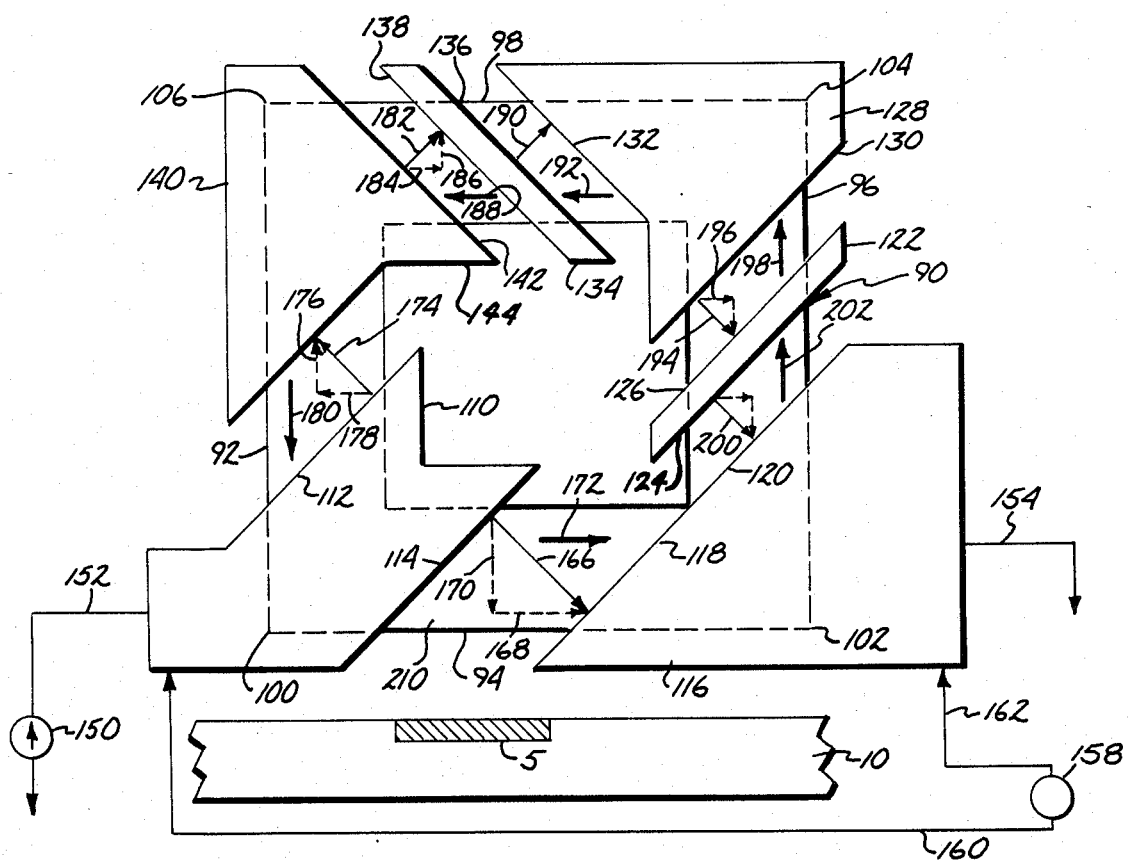
FIG. 2 shows the picture frame embodiment of the present invention.

Having disclosed a first embodiment of the invention, the second embodiment of the invention is shown in FIG. 2.

FIG. 2 shows a folded, or endless, magnetoresistive element 90. Element 90 has a square, or rectangular, "picture frame" shape, and is comprised of first vertical leg 92, first horizontal leg 94, second vertical leg 96, and second horizontal leg 98. THe element 90 has corners 100, 102, 104 and 106 as shown. A first equipotential strip 110 is disposed across corner 100, having a first edge 112 angled across leg 92 and a second edge 114 angled across leg 94. A second equipotential strip 116 is disposed across corner 102 having a first edge 118 angled across leg 94 and a second edge 120 angled across leg 96. A third equipotential strip 122, having edges 124, 126 is angled across leg 96. A fourth equipotential strip 128 is disposed across corner 104 having first edge 130 angled across leg 96 and second edge 132 angled across leg 98. A fifth equipotential strip 134 having edges 136, 138 is angled across leg 98. A sixth equipotential strip 140 is disposed across corner 106, having a first edge 142 angled across leg 98 and a second edge 144 angled across leg 92. The respective edges of the equipotential strips 110, 116, 122, 128, 134 and 140 cross legs 92, 94, 96 and 98 at angles of approximately 45 degrees in FIG. 2. The crossing angles of the strips could, however, be varied depending on the results desired, and accordingly, the invention is not intended to be limited to a 45 degree disposition of the equipotential strips. A current source 150 has an input 152 electrically connected to first equipotential strip 110 and an output 154 electrically connected to second equipotential strip 116. Voltage drop detection circuit 158 has an electrical connection 160 to first equipotential strip 110 and an electrical connection 162 to second equipotential strip 116. There are two current paths through the element 90 between current source input 152 and current source output 154. The first current path goes from strip 110 through leg 94 to strip 116. The second current path goes from strip 110 through leg 92 to strip 140, from strip 140 through leg 98 to strip 134, from strip 134 through leg 98 to strip 128, from strip 128 through leg 96 to strip 122, and from strip 122 through leg 96 to strip 116.

The first current path described above passes through leg 94 from strip 110 to strip 116 in the direction of vector 166 due to the fact that current enters and leaves equipotential surfaces in a direction normal to the equipotential surfaces as previously noted. Vector 166 has longitudinal component 168 and transverse component 170. Applying the right hand rule to transverse compo nent 166 we see that the direction of the magnetic field generated in the first horizontal leg 94 is in the direction of vector 172.

Turning to the second current path described above, the current leaves strip 110 in the direction of vector 174. Vector 174 has longitudinal component 176 and transverse component 178. Applying the right hand rule to transverse vector 178, the magnet flux in leg 92 will be in the direction of vector 180. The current will leave equipotential strip 140 in the direction of vector 182. Applying the right hand rule to the transverse vector component 186, leg 98 will be magnetized in the direction of vector 188. It is obvious that the same analysis applied to the current leaving strip 134 along vector 190 would indicate a direction of magnetism along vector 192. Current would leave equipotential element 128 in the direction of vector 194. Applying the right hand rule to the transverse component 196 indicates a direction of magnetism in leg 96 along vector 198. Applying the same analysis to the vector 200, which represents current leaving strip 122, the direction of magnetic flux is along vector 202.

It can, therefore, be appreciated that the legs 92, 94, 96 and 98 of the picture frame element 90 are magnetized in a counterclockwise direction in FIG. 2 as indicated by the vectors 172, 202, 198, 192, 188 and 180. Hence, the magnetic fields of the legs 92, 94, 96 and 98 are designed to aid one another by virtue of the placement of the equipotential strips 110, 116, 122, 128, 134 and 140 and the connections of the biasing current source 150 to the elements 110 and 116.

The element 90 is, in effect, an elongated element having its ends joined at the middle of the second horizontal leg 98. In that the picture frame magnetoresistive element 90 is folded into an endless frame with its ends being, in effect, joined, there are no ends of the element to produce multidomain demagnetizing forces. Hence, the legs 92, 96, and 98, and particularly 94, are converted to single domain magnetization udner a relatively small bias current. Leg 94 is designed to have no more than one tenth of the resistance of the current path through legs 92, 96 and 98, and therefore, carries at least ten times as much current as passes through the legs 92, 96, 98. As shown in FIG. 2, the element 90 is vertically arranged with respect to the recording medium 10 and only the lower leg 94 of element 90 is disposed in proximity to the selected data track 5. The portion of leg 94 between the second edge 114 of strip 110 and the first edge 118 of strip 116 is the sensing region 210 of element 90 in that the voltage drop detection circuitry 158 sense the voltage drop across the region 210 from equipotential element 110 to equipotential element 116. As data track 5 moves past the element 90 (or out of the page normally in FIG. 2), the resistance of the sensing region 210 of the magnetoresistive element 90 varies in response to the magnetic fields recorded on the medium 10. This variation in the resistance of region 210 is detected by the circuitry 158 and converted into a suitable output which is representative of the data on the medium.

As was the case with the elongated element 1, the relatively small bias current required to convert the element 90 into a single domain magnetization, generates a relatively small magnetic field in the leg 94 of element 90 so that there is no danger that the data recorded on the medium will be altered. Moreover, since sensing region 210 is single domain, Barkhausen noise is eliminated in the output.

It was previously noted that there are two current paths through the element 90. As noted above, the element 90 is designed so that the current path directly through leg 94 has no more than one tenth of the resistance of the current path through legs 92, 96, 98. Consequently, the current through the "read leg" 94 is at least 10 times greater than the current through the legs 92, 96, 98, which increases the sensitivity and read capability of the element 90.

Having disclosed two embodiments of the invention, many variations and modifications thereof would be obvious to those skilled in the art in view of the teachings herein, and the invention is therefore intended to be limited only by the scope of the appended claims.

We claim:

1. A magnetic head for detecting information representing magnetic fields on a selected track of a magnetic recording medium, comprising:
    an elongated magnetoresistive element having a distant first end and a distant second end opposite thereto, and a central region intermediate to said distant first and second ends;
    a means for generating a magnetic field within said element; and
    a means for detecting a change in resistance of said magnetoresistive element across said central region of said element as said magnetic fields of said recording medium are presented to said central region, said detection means excluding any changes in resistance of the ends of said element.

2. The magnetic head of claim 1, wherein a first equipotential strip is disposed at an acute angle across said element, and a second equipotential strip is disposed of an acute angle across said element, said first and second equipotential strips being disposed at opposite ends of said central region of said element whereby said central region is defind by the region of said element between said first and second equipotential strips, said detection means including circuitry operatively associated with said first and second equipotential strips to sense the change in resistance of said central region of said magnetoresistive element.

3. The magnetic head of claim 2 wherein said magnetic field generating means comprises a means for forcing current through said magnetoresistive element and said detection means comprises electrical contacts connected from detection circuitry of said detection means to said first and second equipotential strips, said detection circuitry measuring the voltage drop across said central region of said element between said first and second equipotential strips.

4. The magnetic head of claim 1 wherein said magnetic field generating means comprises a means for forcing current through said magnetoresistive element, and wherein said current flowing through said element is sufficient to produce a single domain magnetic orientation in said central region.

* * * * *